(12) United States Patent
Levin et al.

(10) Patent No.: US 7,832,449 B2
(45) Date of Patent: Nov. 16, 2010

(54) TIRE MOUNTING AND DISMOUNTING METHODS AND SYSTEMS

(75) Inventors: Robert Kenjiro Levin, 3328 Bevis St., San Diego, CA (US) 92111-5018; Sakae Tasaki, Ishioka (JP)

(73) Assignee: Robert Kenjiro Levin, San Diego, CA (US)

( * ) Notice: Subject to any disclaimer, the term of this patent is extended or adjusted under 35 U.S.C. 154(b) by 443 days.

(21) Appl. No.: 11/428,334

(22) Filed: Jun. 30, 2006

(65) Prior Publication Data

US 2007/0235145 A1 Oct. 11, 2007

Related U.S. Application Data

(60) Provisional application No. 60/696,434, filed on Jun. 30, 2005.

(51) Int. Cl.
*B60C 25/132* (2006.01)
*B60C 25/12* (2006.01)

(52) U.S. Cl. ..................... 157/1.17; 157/1.47
(58) Field of Classification Search ............... 157/1.1, 157/1.17, 1.2, 1.22, 1.26, 1.47, 1.43, 1.48, 157/5
See application file for complete search history.

(56) References Cited

U.S. PATENT DOCUMENTS

| 1,353,020 | A | * | 9/1920 | Brand | 157/1.22 |
|---|---|---|---|---|---|
| 2,597,268 | A | * | 5/1952 | Simpson | 157/1.1 |
| 2,635,682 | A | * | 4/1953 | Rerick | 157/1.2 |
| 3,029,861 | A | * | 4/1962 | Gambardella | 157/1.22 |
| 3,037,549 | A | * | 6/1962 | Jacobson | 157/1.22 |
| 4,451,963 | A | * | 6/1984 | Karr et al. | 29/407.04 |
| 4,461,335 | A | * | 7/1984 | Beemer | 157/1.22 |
| 4,610,288 | A | * | 9/1986 | Huinink et al. | 157/1.22 |
| 4,676,291 | A | * | 6/1987 | Bolger | 157/1.17 |
| 5,094,284 | A | * | 3/1992 | Curcuri | 157/1.17 |
| 5,141,040 | A | * | 8/1992 | Curcuri | 157/1.17 |
| 5,222,538 | A | * | 6/1993 | Tomita et al. | 157/1 |
| 6,024,151 | A | * | 2/2000 | Ochoa | 157/1.3 |
| 6,135,185 | A | * | 10/2000 | Cuckrovani | 157/1.17 |
| 6,422,285 | B1 | * | 7/2002 | Gonzaga | 157/1.24 |
| 6,659,153 | B1 | * | 12/2003 | Kupka | 157/1.24 |
| 6,907,913 | B1 | * | 6/2005 | Keisel et al. | 157/1.2 |

FOREIGN PATENT DOCUMENTS

EP         493073 A1 *  7/1992

(Continued)

*Primary Examiner*—David B Thomas
(74) *Attorney, Agent, or Firm*—Pillsbury Winthrop Shaw Pittman LLP

(57) ABSTRACT

Apparatus and methods are described for mounting and dismounting tires. Apparatus typically comprises a pressing assembly positionable relative to a fixed wheel rim such that the pressing assembly controls force distribution across selected portions of a tire causing a tire bead to be eased onto the wheel rim. The apparatus typically includes an axis of rotation perpendicular to the wheel rim axis and wherein the axis of rotation is positionable in a plane that includes the wheel rim axis. The wheel rim can be fixed to a base assembly and handles allow positioning and transmittal of force to the pressing assembly. A bead breaking assembly for deflating an inflated tire may be provided. Methods of operating these and other such apparatus are described.

19 Claims, 14 Drawing Sheets

FOREIGN PATENT DOCUMENTS

| EP | 649763 | A1 | * | 4/1995 |
| EP | 909667 | A1 | * | 4/1999 |
| FR | 2804908 | A1 | * | 8/2001 |
| JP | 62231806 | A | * | 10/1987 |
| JP | 06016023 | A | * | 1/1994 |

* cited by examiner

TIRE MOUNTING AND DISMOUNTING METHODS AND SYSTEMS

CROSS-REFERENCE TO RELATED APPLICATIONS

This application claims the benefit of U.S. provisional application Ser. No. 60/696,434 entitled "SMALL TIRE MOUNTING AND DISMOUNTING METHOD AND FEATURES OF AN EMBODIMENT OF THE METHOD," filed Jun. 30, 2005 and incorporated herein by reference for all purposes.

BACKGROUND OF THE INVENTION

1. Field of the Invention

Aspects of the present invention relate generally to tire changing tools and methods and more particularly to efficient systems and methods for mounting and dismounting tires.

2. Description of Related Art

Pneumatic tires are used by a wide range of vehicles including automobiles, trucks, motorcycles, racing karts, golf carts, and light aircraft, as well as for various other friction reducing and guiding applications in all sorts of equipment. In many applications, mounting and dismounting pneumatic tires from rims requires either expensive machinery or physical strength and skilled hand manipulation of the tire and rim.

For example, racing kart tires are typically mounted on five or six inch diameter rims using only hand manipulation. Mounting and dismounting is typically done using hand manipulation in conjunction with simple tools as shown in FIG. 1A and FIG. 1B. Typical mounting and dismounting tools include hand powered bead breaking tools, which are simple tools that dislodge a mounted tire bead from the bead perch of a rim making dismount easier, and tire levers such as the tire lever shown in FIG. 1A, which are prying tools used to force part of a tire bead onto a rim to aid mounting, or to force part of a tire bead away from a rim to aid dismounting.

Mounting tires by hand manipulation is typically a physically exhausting and time consuming process and requires skill in handling the tires, wheels, and tire changing tools. In order to mount a tire using existing methods, the tire is forced onto the rim using muscular force and then skillfully manipulated to distort the tire sufficiently to make it slip onto the rim. The skill required involves properly maintaining the angle of the rim with respect to the tire while simultaneously distorting the tire and applying appropriate force to push the tire onto the rim.

Dismounting a tire by hand requires use of a bead breaking tool to dislodge the tire bead from the rim, insertion of one or more levers between the tire bead and rim, followed by rotation of the tire levers to force the tire off of the rim. Improper use of these tools can result in damage to the tire bead, sidewall, or the rim as well as injury to the person dismounting the tire.

Some of the difficulty of existing mounting and dismounting methods occurs because the rim is frequently not fixed to any restraining base. Typically the rim and tire are on a floor or other hard surface, which may also be slippery, requiring the operator to restrain the assembly with their hands, feet, knees, or other body parts while simultaneously trying to manipulate the tire, wheel, and tools to mount or dismount the tire.

Mounting soft tires using existing methods is physically tiring to the hands and arms because of the need to use both manipulation of the tire and rim and physical force. When mounting tires of harder or more rigid construction, mounting using only the hands and hand tools becomes even more difficult because the tire is not easily distorted, making it very difficult for a tire installer to force the tire onto a rim. As a consequence, existing methods of hand mounting of tires can be both physically exhausting and mentally frustrating.

Existing tire changing technology also includes powered machinery such as the simplified exemplary machine shown in FIG. 2 which is used to mount and dismount tires. Existing machinery, however, is complex in design, expensive, and exposes tires to large stresses that can cause tire or rim damage and injury to the person mounting or dismounting the tire. Existing tire machinery is typically large and heavy which makes it difficult or impractical to move or transport the machinery easily or use the machinery in applications requiring portable equipment.

In addition, existing tire changing machinery typically requires rotation of a lever mechanism around the tire and rim in order to mount and dismount tires as shown in FIG. 1B and FIG. 2. This rotation forces the tire bead onto and off of the rim by moving a lever around the circumference of the rim or rotating the rim itself relative to the lever. This process has the disadvantage of excessively stressing and potentially damaging the tire bead, as well as potentially damaging the tire or rim or injuring the person mounting or dismounting the tire if their body parts become compressed or entangled with the rotating lever mechanism.

Conventional systems such as those described previously can be expensive, difficult to use, require a fairly high level of skill and strength, and may subject persons mounting or dismounting tires to injury. Accordingly, a need remains in the art for an efficient tire changing method and system that does not suffer from problems afflicting the conventional systems and methods.

BRIEF SUMMARY OF THE INVENTION

Embodiments of the present invention overcome the above-mentioned and various other shortcomings of conventional tire mounting and dismounting technology, providing efficient tire mounting and dismounting systems and methods. As set forth in detail below, tire mounting and dismounting methods and systems according to the present invention allow efficient mounting and dismounting of tires with minimal physical exertion.

In accordance with one embodiment, for example, a system of mounting tires includes a pressing assembly operative to progressively apply force to a tire to mount the tire onto a rim while minimizing stress on the tire, including the tire beads. A system according to the present invention may comprise elements including a coupling to effect translation and rotation of the pressing assembly, a base assembly, a friction enhancing surface, as well as one or more bead breaking assemblies. A method of tire mounting according to the present invention may include one or more of the steps of fixing a rim to a mounting base, applying force to one or more areas of the tire, and progressively and selectively adjusting the level of force and applied area to ease the tire onto the rim while minimizing stress on areas of the tire, including the tire beads.

DETAILED DESCRIPTION OF THE INVENTION

The present invention will now be described in detail with reference to the drawings, which are provided as illustrative examples of the invention so as to enable those skilled in the art to practice the invention. Notably, the figures and examples below are not meant to limit the scope of the present invention to the recited embodiments but rather other embodiments are possible by way of interchange of some or all of the described or illustrated elements. Moreover, where certain elements of the present invention can be partially or fully implemented using known components, some or all of those known components may be omitted so as not to obscure the invention. In the present specification, an embodiment showing a singular component should not be limiting; rather, the invention is intended to encompass other embodiments including a plurality of the same component, and vice-versa, unless explicitly stated otherwise herein. Further, the present invention encompasses present and future known equivalents to the known components and steps referred to herein by way of illustration.

According to certain general aspects, a tire mounting and dismounting system according to the present invention provides an efficient means for mounting and dismounting tires from rims. Rather than employing skilled and physically intense tire and rim manipulation, the present invention provides simple and efficient mechanically assisted means for installing and removing tires from rims. A tire mounting and dismounting system according to the present invention may be operative to mount a tire to a rim by selectively applying a variable force profile to a selected area of a tire to cause the tire bead to slip onto a rim in a substantially sideways motion, causing contact only between the tire being mounted and the rim. A system according to the present invention may be operative to minimize stresses to areas of the tire during mounting and dismounting, such as, for example, the tire bead. A system according to the present invention may also provide a stable base assembly to affix a tire and rim combination for mounting and dismounting and may present a tire and rim at a convenient angle for mounting and dismounting the tire. In addition, a system according to the present invention may provide a pressing assembly operative to press a tire onto a rim while mounting a tire, and break the seal of a tire bead to a rim prior to dismounting. A system according to the present invention may provide one or more bead breaking assemblies to aid in breaking the seal between a tire bead and rim.

Figure 1A:
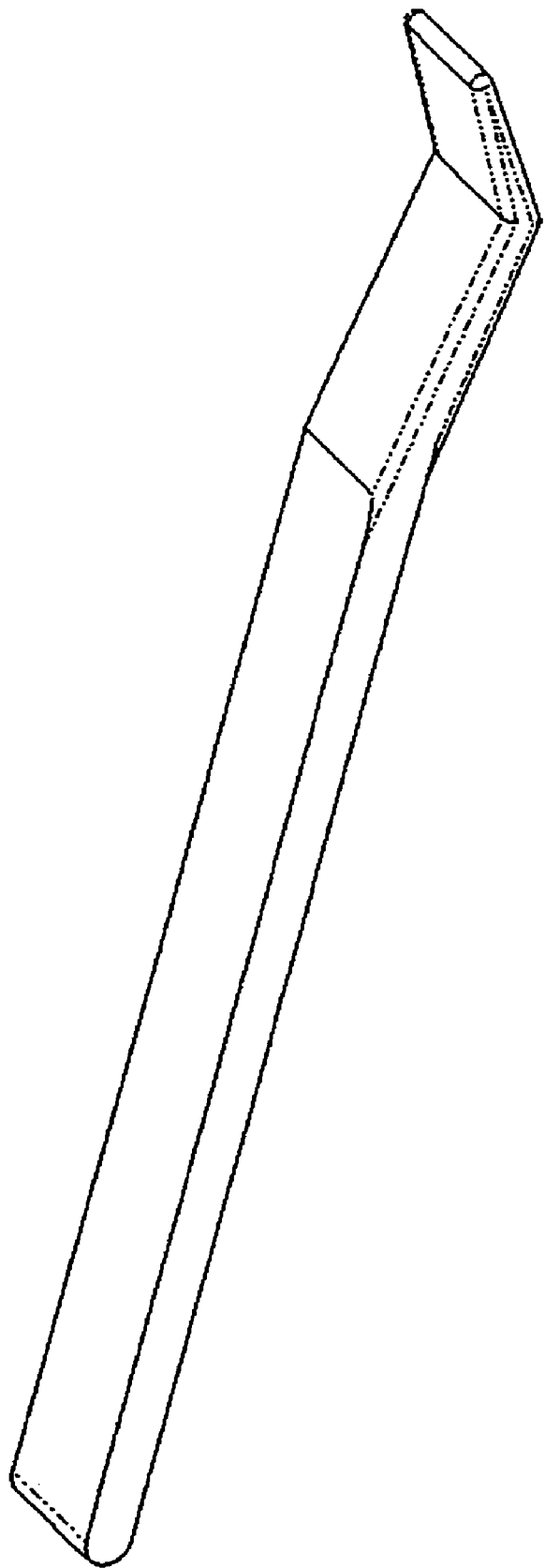
FIG. 1A is a simplified illustration of a typical tire lever tool.
Figure 1B:
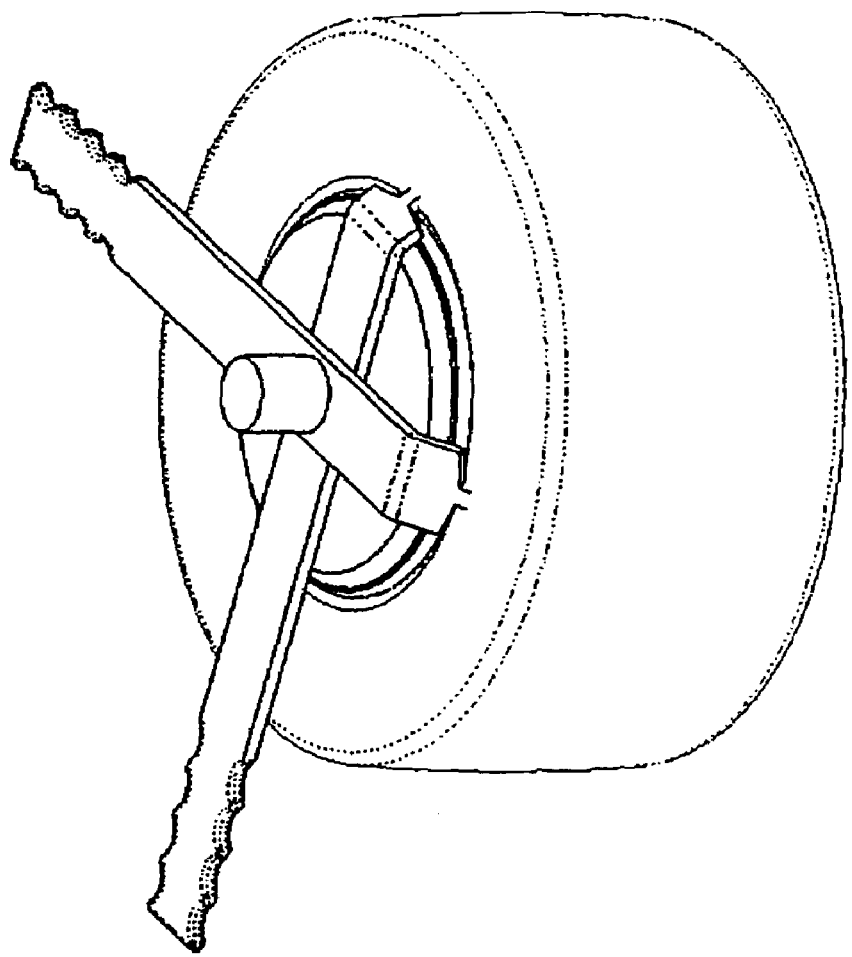
FIG. 1B is a simplified illustration of a typical tire mounting and dismounting apparatus.
Figure 2:
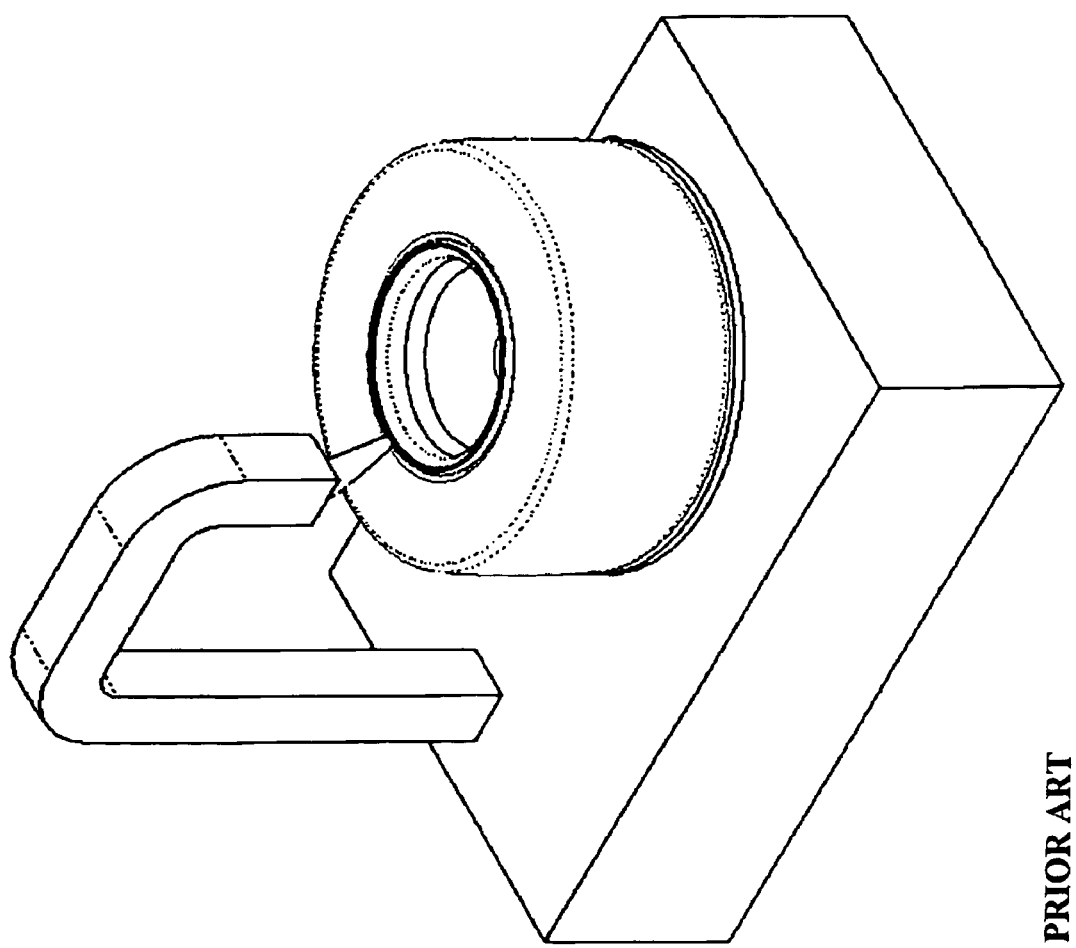
FIG. 2 is a simplified illustration of a typical powered tire mounting and dismounting machine.
Figure 3:
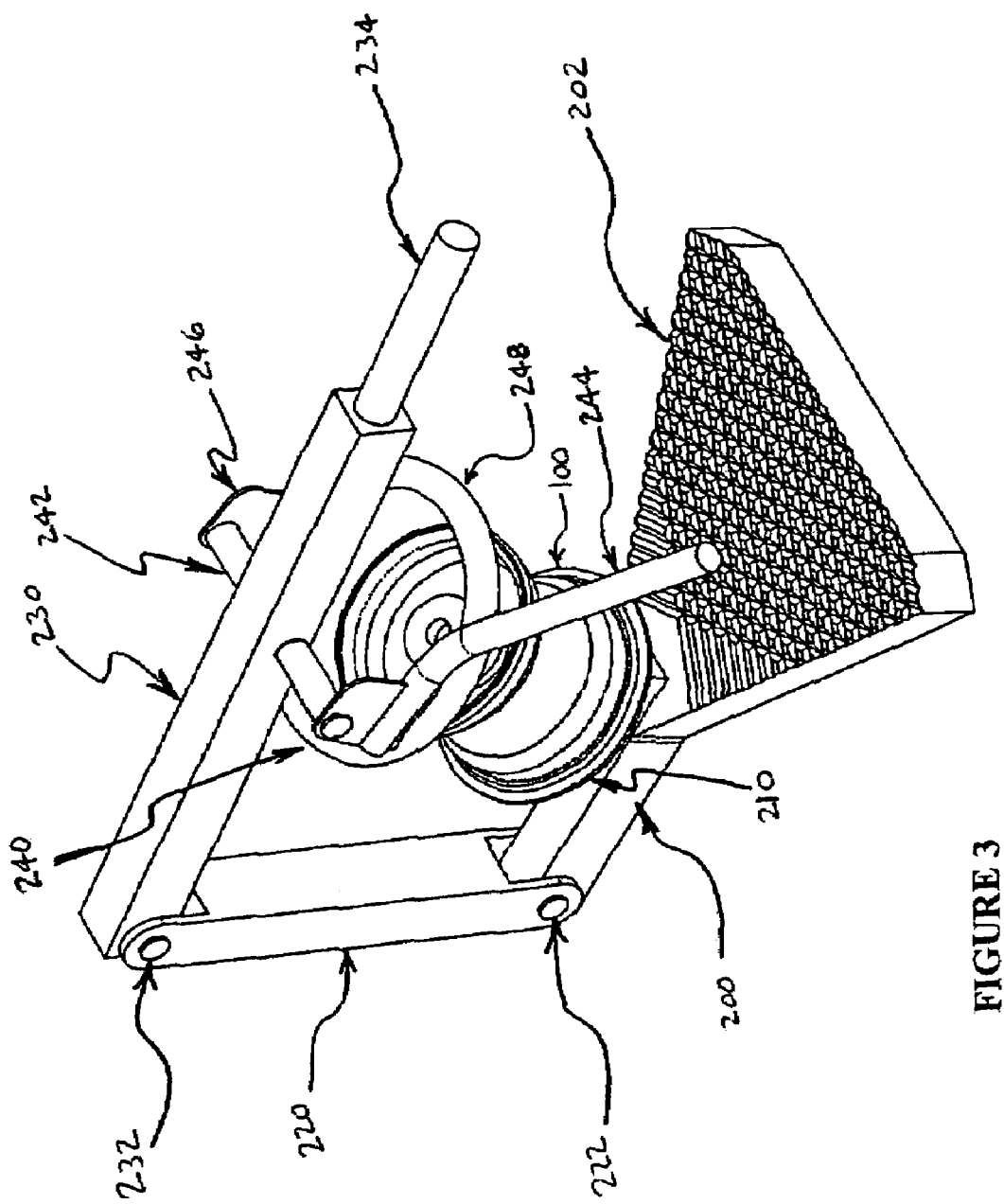
FIG. 3 is a perspective illustration of certain aspects of a system for mounting and dismounting tires according to the present invention.
Figure 4:
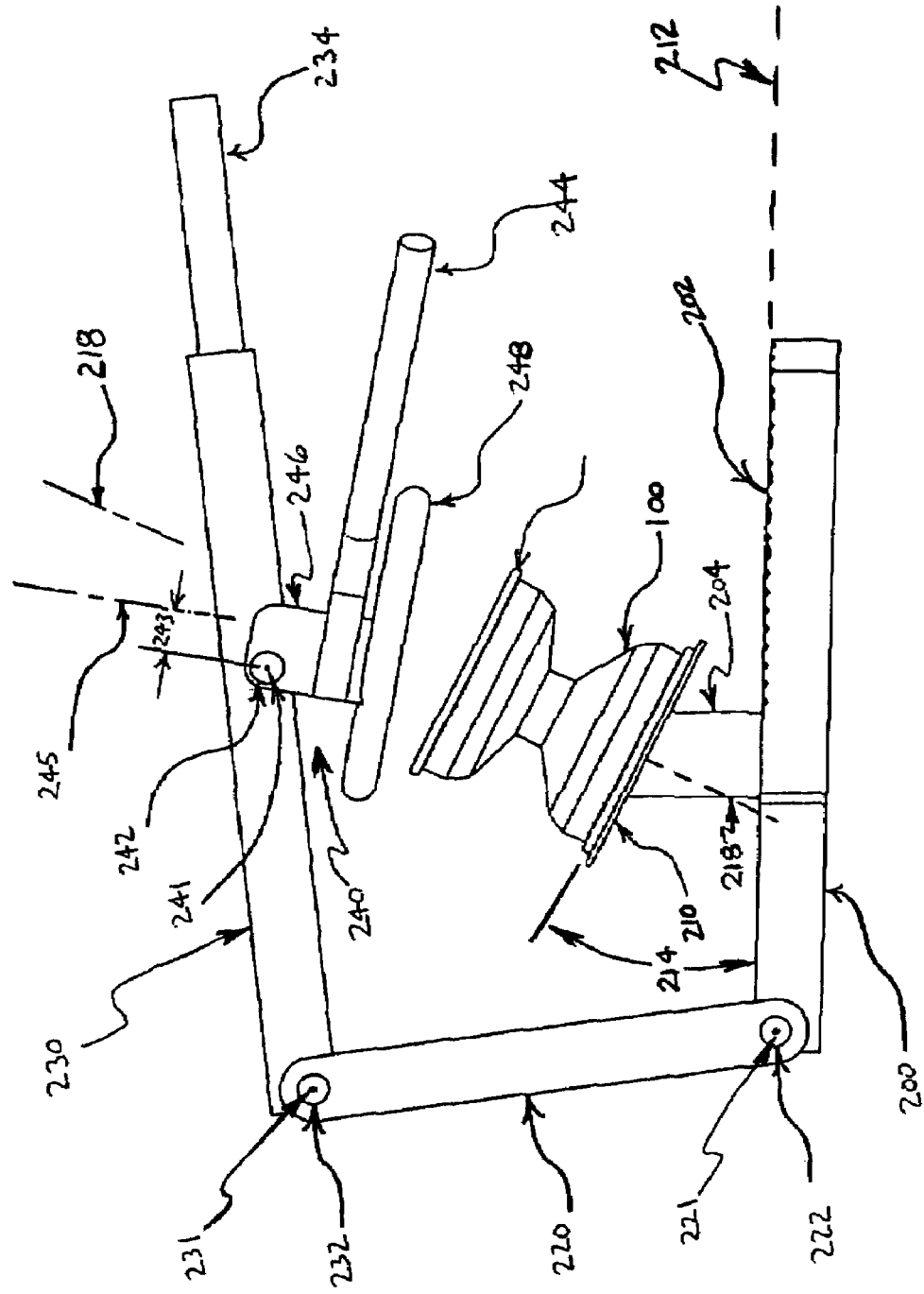
FIG. 4 is a side view illustration of certain aspects of a system for mounting and dismounting tires according to the present invention.
Figure 7:
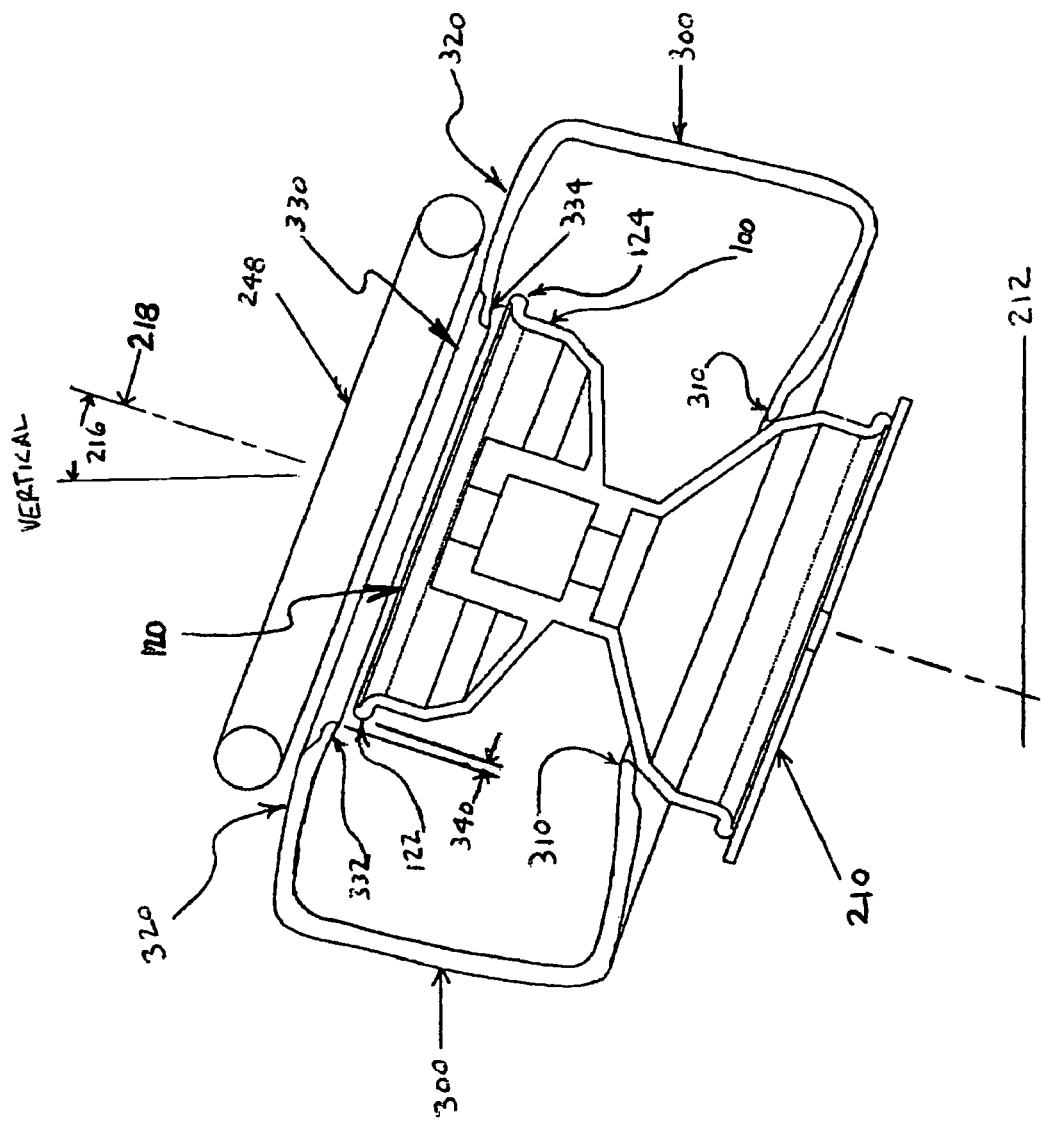
FIG. 7 is a sectional view illustrating certain aspects of mounting and dismounting a tire according to the present invention.
Figure 8:
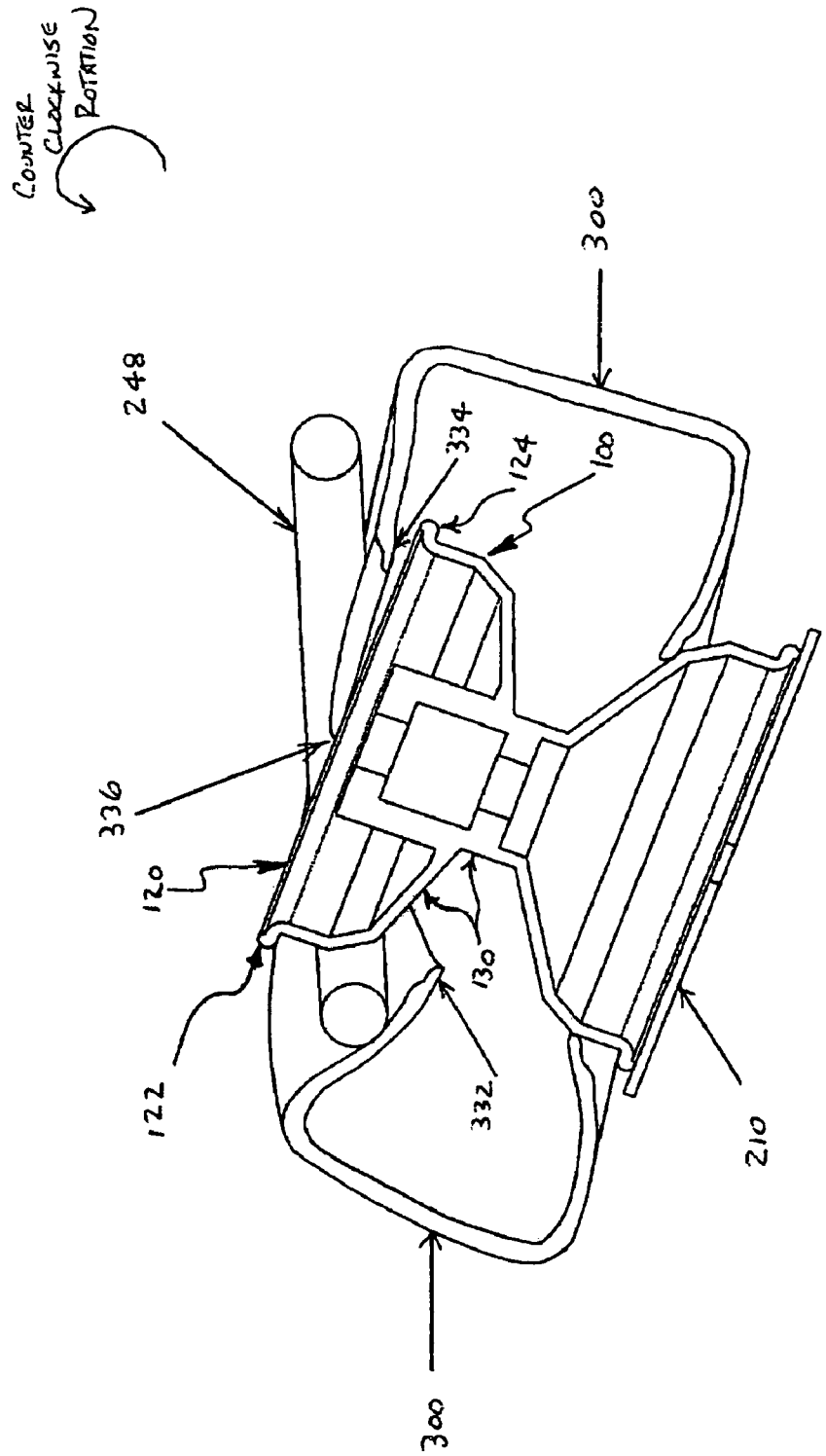
FIG. 8 is a sectional view illustrating certain aspects of mounting and dismounting a tire according to the present invention.
Figure 9:
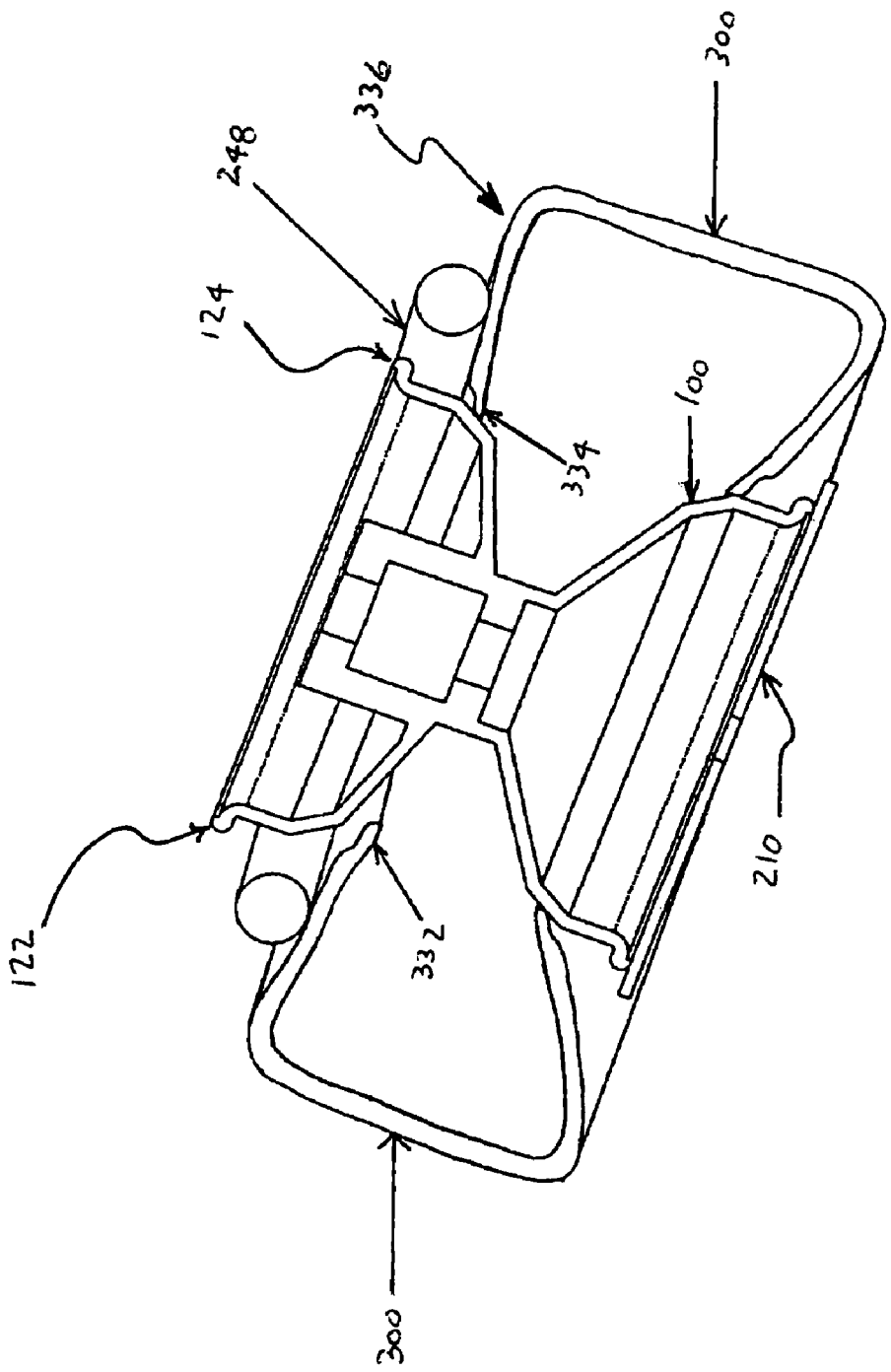
FIG. 9 is a sectional view illustrating certain aspects of mounting and dismounting a tire according to the present invention.

A tire mounting and dismounting system according to certain aspects of the present invention is shown in FIGS. 3 and 4. As illustrated in FIGS. 3 and 4, one embodiment of a tire mounting and dismounting system may comprise elements including a bar, such as a backbone bar 230, a pressing assembly such as a pressing assembly 240, and a pivot axis 241, wherein the backbone bar 230 and pressing assembly 240 are operative to translate pivot axis 241 relative to a tire rim 100, and pressing assembly 240 is further operative to rotate about pivot axis 241 so as to progressively apply a force profile or pressure profile to selected areas of a tire 300 as shown in FIGS. 7, 8, and 9 to mount a tire 300 onto a rim. In one exemplary embodiment a force profile may be applied to the sidewall of tire 300. In certain embodiments a force profile may be applied to other areas of a tire 300 such as the tire tread or a combination of areas such as the sidewall and tread.

Certain embodiments of the present invention may comprise elements including a base assembly such as a base assembly 200, a friction enhancing surface 202, a connecting bar 220, a backbone bar 230, and a pressing assembly 240. Some embodiments of the present invention may be constructed of lightweight materials to be portable and readily transportable by one person. Some embodiments may be constructed to be permanently or detachably attached to a surface such as a wall or floor. Some embodiments may be configured to be operated by one person without powered assistance. Some embodiments may be configured to allow for powered mechanical assistance, such as, for example, by internal combustion engine, electricity, compressed gas, or other power supplying apparatus, to various operations of the present invention.

As further illustrated in FIGS. 3 and 4, a rim 100 may be affixed to a reference position, such as, for example, a restraining base 210. The rim 100 may be affixed to restraining base 210 by a threaded rod and bolt assembly or by other means known in the art. The restraining base 210 may be oriented such that a mounting surface of the restraining base is rotationally offset from a reference plane 212 as shown in FIG. 4. Restraining base 210 may be operative to allow rotational or translational movement of a tire rim 100 in conjunction with movement of pressing assembly 240 or independently. In one exemplary embodiment the restraining base 210 may be offset by an angle 214 between approximately 0 degrees and approximately 45 degrees. The reference plane 212 may be coplanar with the surface of the floor or ground on which the tire mounting system is positioned, coplanar with a surface of base assembly 200 such as the top surface, or coplanar with another reference surface such as a friction enhancing surface 202. A post 204 may also be affixed to base assembly 200 and restraining base 210 so that restraining base 210 is offset from base assembly 200.

Pressing assembly 240, operative to rotate about a pivot axis 241 as shown in FIG. 4, may comprise a pressing element 248 affixed to a pivot attachment mechanism 246 wherein pivot attachment mechanism 246 may be constructed of rigid materials such as metal, plastic, composite materials, tubing, plate, or similar materials. A handle bar 244 may be attached to pivot attachment mechanism 246 or pressing element 248 and may be operative to effect movement of pressing assembly 240. Pressing assembly 240 may be operatively connected to a coupling, such as a backbone bar 230, a connecting bar 220, or both a backbone bar 230 and connecting bar 220. Pressing assembly 240 may be affixed to a backbone bar 230 by a pivot mechanism 242 wherein pivot mechanism 242 may comprise of pins, axles, bearings, or other mechanisms for effecting rotation of pressing assembly 240 about pivot axis 241.

Pressing element 248 may comprise an open or closed structure, hoop, ring, or other structure and may be constructed of rigid materials such as metal, plastic, composite materials, tubing, or similar materials. In one exemplary embodiment pressing element 248 may comprise a substantially circular hoop of solid or tubular material where the inner diameter of the hoop is greater than the outer diameter of rim 100. In certain embodiments the pressing element 248 may have one or more breaks, allowing the hoop structure to rotate or pivot around or through other elements of a tire mounting and dismounting system.

Pressing assembly 240 may also comprise a handle bar. In one exemplary embodiment a handle bar 244 may be affixed to pressing element 248 and pivot attachment mechanism 246. Handle bar 244 may comprise a handle or lever or similar structure and may be rigidly or detachably affixed to pressing element 248, pivot attachment mechanism 246, or both.

Pressing assembly 240 may be constructed such that pivot axis 241 is positioned at an offset 243 from the center axis 245 of pressing element 248. This offset 243 may be selected so as to reduce the required manipulation of and forces applied to handle bar 244 and to minimize movement of handle bar 244 during tire mounting.

Backbone bar 230 may be constructed of rigid materials such as metal, plastic, composite materials, tubing, or similar materials. Backbone bar 230 may include a backbone handle 234 which may be integral to backbone bar 230 or may be attached by attachment methods known in the art such as welding, threading, gluing, or other methods. Backbone bar 230 may be affixed to pressing assembly 240 through a pivot mechanism 242 such that pressing assembly 240 is operative to rotate about pivot axis 241.

Backbone bar 230 may also be affixed to a connecting bar 220 through pivot mechanism 232 such that backbone bar 230 is operative to rotate about pivot axis 231 as shown in FIG. 4. Pivot mechanism 232 may comprise of pins, axles, bearings, or similar mechanisms for providing rotation of backbone bar 230 about pivot axis 231. Connecting bar 220 may be constructed of rigid materials such as metal, plastic, composite materials, tubing, or similar materials. Connecting bar 220 may further be constructed of flexible materials, such as, for example, springs or spring steel, to allow translation of backbone assembly 230 and pressing assembly 240 with respect to connecting bar 220 and base assembly 200. In certain embodiments connecting bar 220 may be coupled to a base assembly 200 via a pivot or hinge assembly. In other embodiments connecting bar 220 may be coupled to a fixed or movable structure, such as a wall, floor or movable frame, to allow hinged or pivoted movements of connecting bar 220 with respect to the structure. In certain embodiments, connecting bar 220 may be coupled to a structure such as a wall or floor wherein the coupling is operative to allow movement of connecting bar 220 about a pivot axis, hinge, or similar structure.

Certain embodiments of the present invention may include a base assembly 200. Base assembly 200 may be constructed of rigid materials such as metal, plastic, composite materials, tubing, or similar materials. Connecting bar 220 may be affixed to base assembly 200 through pivot mechanism 222 such that connecting bar 220 is operative to rotate about pivot axis 221 as shown in FIG. 4. Pivot mechanism 222 may comprise pins, axles, bearings, or similar mechanisms for providing rotation of connecting bar 220 about pivot axis 221. In certain embodiments base assembly 200 may be fixed to a wall, floor, or other fixed surface, whereas in some embodiments, base assembly 200 may be unattached to any surface.

A friction enhancement surface 202 may be integral with or affixed to base assembly 200 and may be operative to enhance restraint of the present invention when placed on a floor or other mounting surface. In one exemplary embodiment an operator may apply pressure to friction enhancing surface 202 through legs, arms, or other body parts to restrain motion of base assembly 200. In some embodiments friction enhancing surface 202 may be operative to restrain motion of base assembly 200 by application of weight or pressure through mechanical means such as clamping, bolting, or other means known in the art.

Friction enhancing surface 202 may be formed integrally with base assembly 200 by, for example, rolling or cutting base assembly 200 with a die or cutting tool. Alternately, friction enhancing surface 202 may be affixed to base assembly 200 by welding, gluing, bolting, or other attachment methods known in the art. Friction enhancing surface 202 may comprise of hard or soft materials chosen such that the materials provide enhanced friction over similar smooth surfaces to aid in operation of the present invention.

Figure 5:
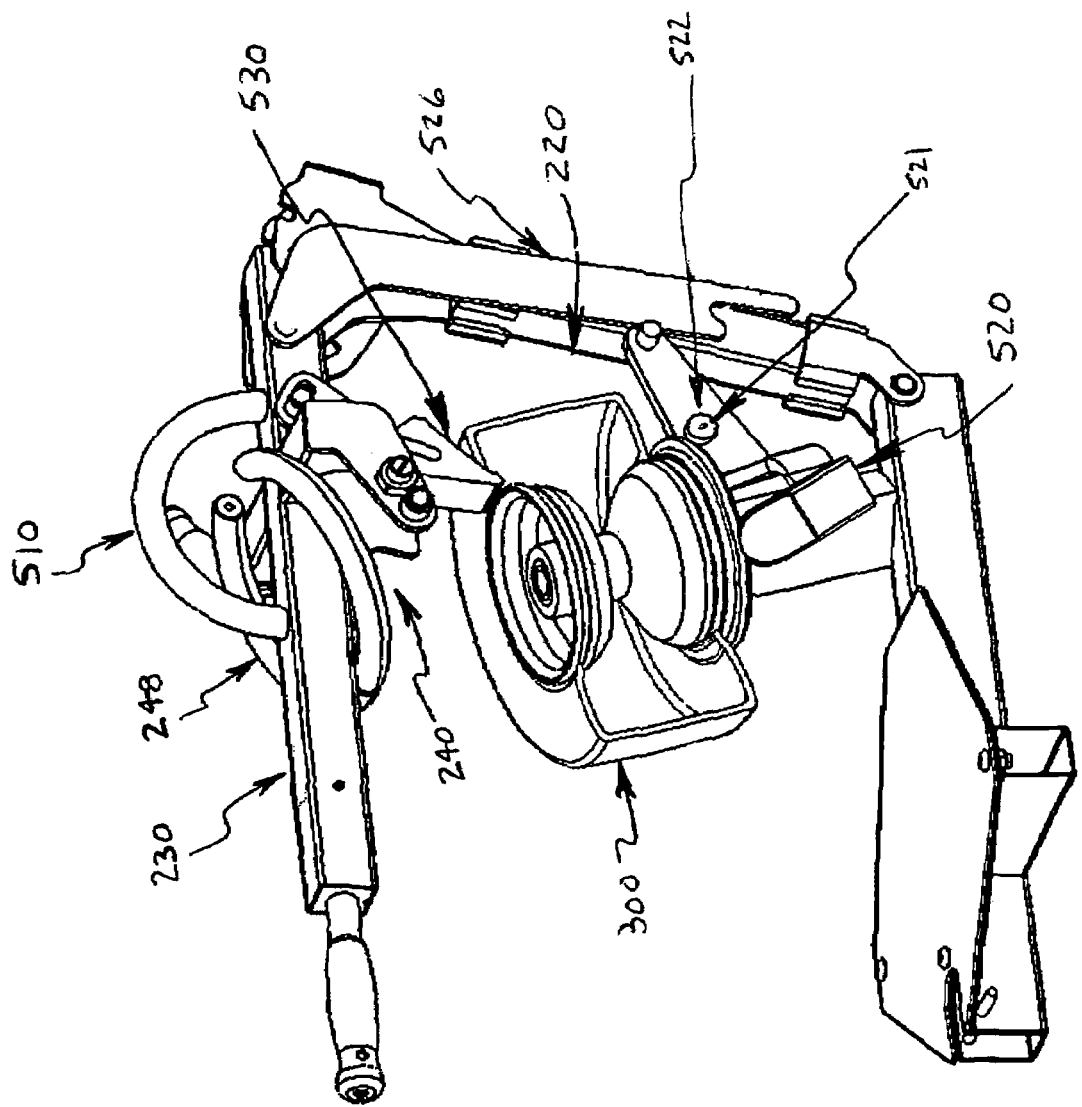
FIG. 5 is a perspective illustration of certain aspects of a system for mounting and dismounting tires according to the present invention.
Figure 6:
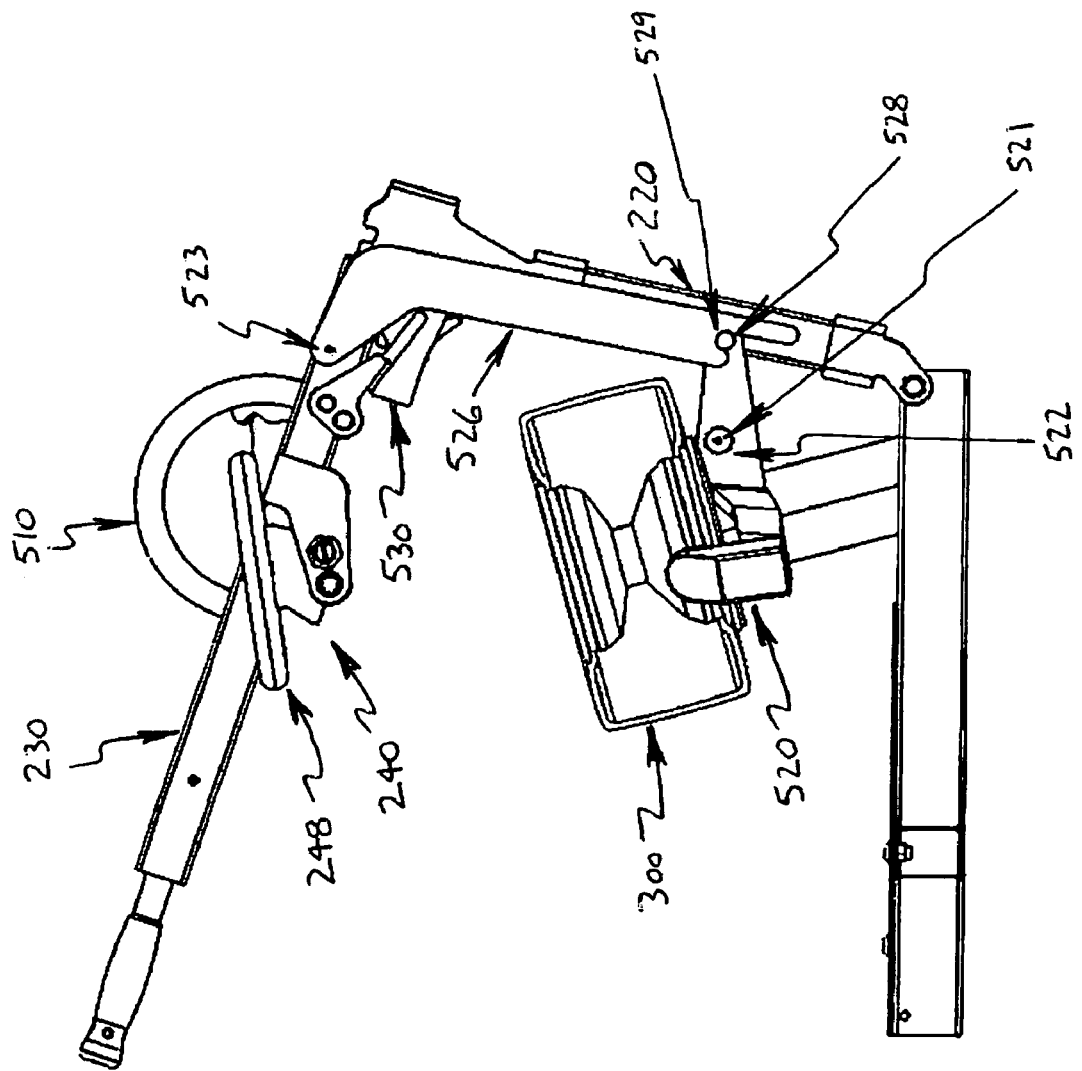
FIG. 6 is a side view illustration of certain aspects of a system for mounting and dismounting tires according to the present invention.
Figure 10:
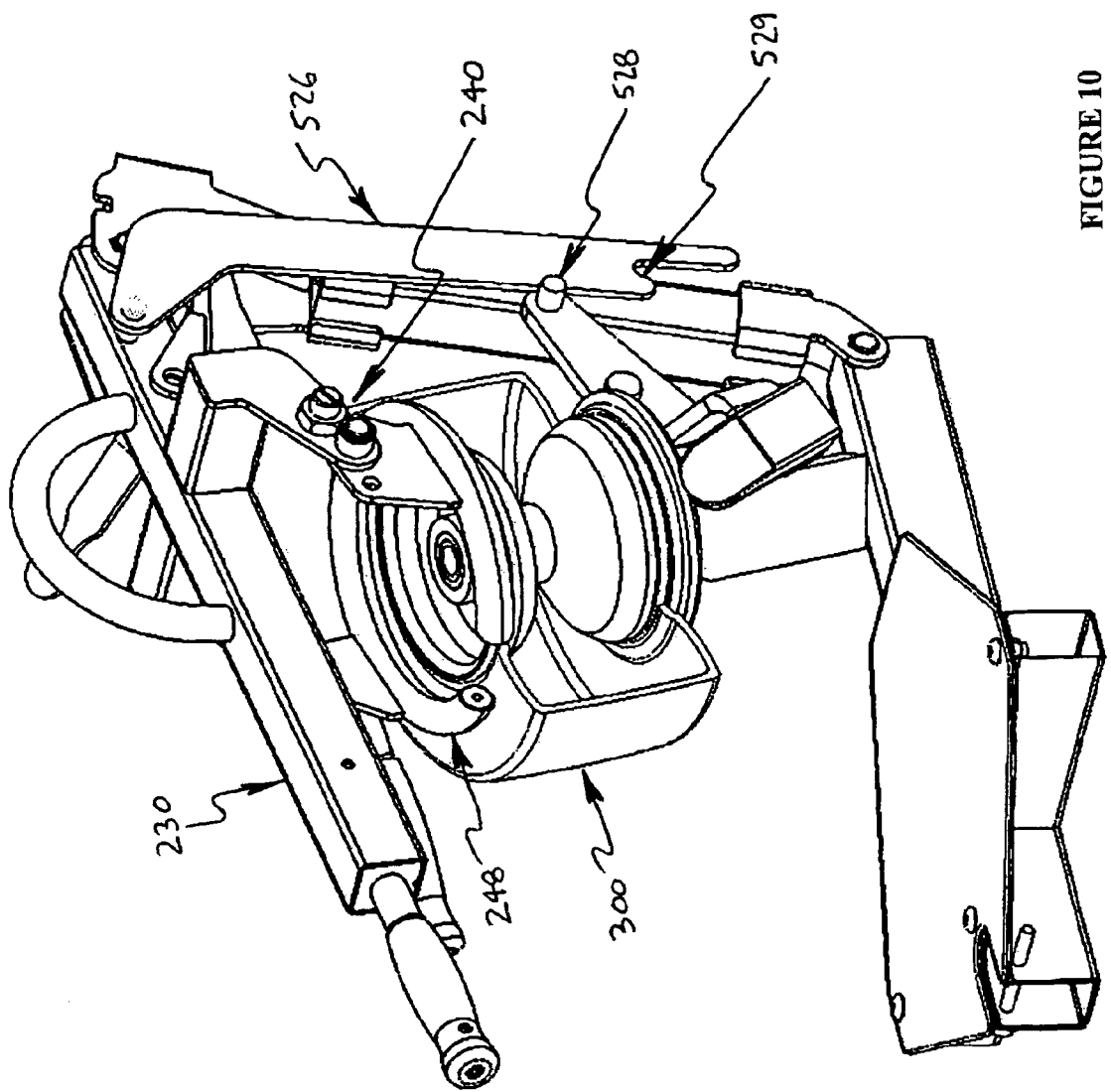
FIG. 10 is a perspective illustration of certain aspects of a system for mounting and dismounting tires according to the present invention.
Figure 11:
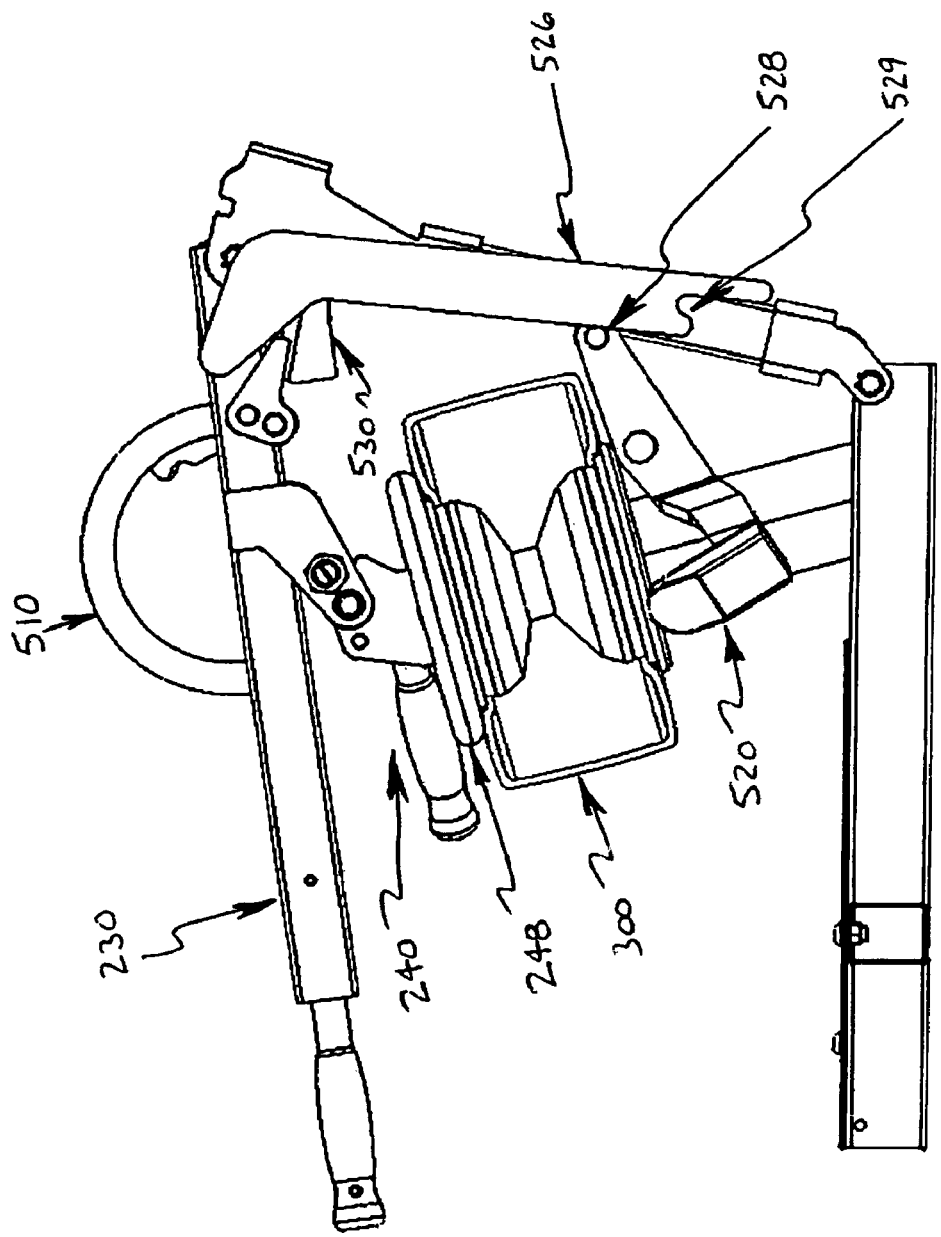
FIG. 11 is a side view illustration of certain aspects of a system for mounting and dismounting tires according to the present invention.

Certain embodiments of the present invention may be further illustrated with reference to FIGS. 5, 6, 10 and 11. FIGS. 5 and 6 illustrate certain aspects of an embodiment of the present invention wherein a tire mounting and dismounting system may further comprise elements including a backbone handle 510, an open pressing element 248, a lower bead breaking assembly 520, and an upper bead breaking assembly 530. FIGS. 10 and 11 further illustrate certain embodiments of the present invention.

In certain embodiments, backbone handle 510 may be affixed to a backbone bar 230. Backbone handle 510 may be of rectangular, square, oval, circular, or other shapes and may be fabricated from metal, plastic, ceramic, or other rigid materials. Backbone handle 510 may be affixed to backbone bar 230 at one or more locations and may be operative to provide additional leverage when moving backbone bar 230 or moving or rotating pressing assembly 240 or transporting the tire mounting and dismounting system.

Tire pressing assembly 240 may include a tire pressing element 248 wherein the tire pressing element 248 is a structure with one or more breaks in the structure's boundary, forming plural segments. In one exemplary embodiment as illustrated in FIG. 5, pressing element 248 may comprise a hoop shape with one or more breaks in the hoop operative to apply a force profile to a selected area of a tire 300 as shown in FIGS. 10 and 11. In certain embodiments, pressing element 248 is configured with one or more breaks to allow movement of pressing element 248 past backbone bar 230 as shown in FIGS. 5 and 6.

As illustrated in FIGS. 5 and 6, a system according to the present invention may also include a lower bead breaking assembly 520 operative to apply force to an area of a tire 300 to break the seal between the tire bead and rim. Lower bead breaking assembly 520 may be hingedly connected to a backbone bar 230. In one exemplary embodiment lower bead breaking assembly 520 may be operative to rotate about a pivot axis 521 by a pivot means, such as a pivot mechanism 522, wherein pivot mechanism 522 may comprise of pins, axles, bearings, or similar mechanisms for effecting rotation of lower beak breaking assembly 520 about pivot axis 521. Lower bead breaking assembly 520 may be operatively connected to a leverage arm 526 as shown in FIG. 6 by a contact connection or by other means known in the art. Leverage arm 526 may be further connected to backbone bar 230 operative to effect rotation of lower bead breaking assembly 520 about pivot axis 521. Leverage arm 526 and backbone bar 230 may be hingedly connected at a pivot axis 523 operative to rotate or translate lower bead breaking assembly 520. In certain embodiments, leverage arm 526 may be configured as shown in FIGS. 5, 6, 10, and 11 to allow for attachment and detachment from a connecting point 528. Connecting point 528 may include a stud, pin, or any other connection means known in the art. Leverage arm 526 may have an attachment point 529 operative to allow connection, as shown in FIG. 6, or disconnection, as shown in FIG. 11, from lower bead breaking assembly 520. Attachment point 529 may be a round or circular cutout, or any other attachment means known in the art.

Certain embodiments may include an upper bead breaking assembly 530. As illustrated in FIG. 5, an upper bead breaking assembly 530 may be operatively connected to backbone bar 230 to apply force to the upper bead of a tire 300. As further illustrated in FIG. 6, upper bead breaking assembly 530 may be configured to allow rotation or translation of upper bead breaking assembly 530 relative to backbone bar 230 to position upper bead breaking assembly 530 away from tire 300 or pressing assembly 248.

Figure 12:
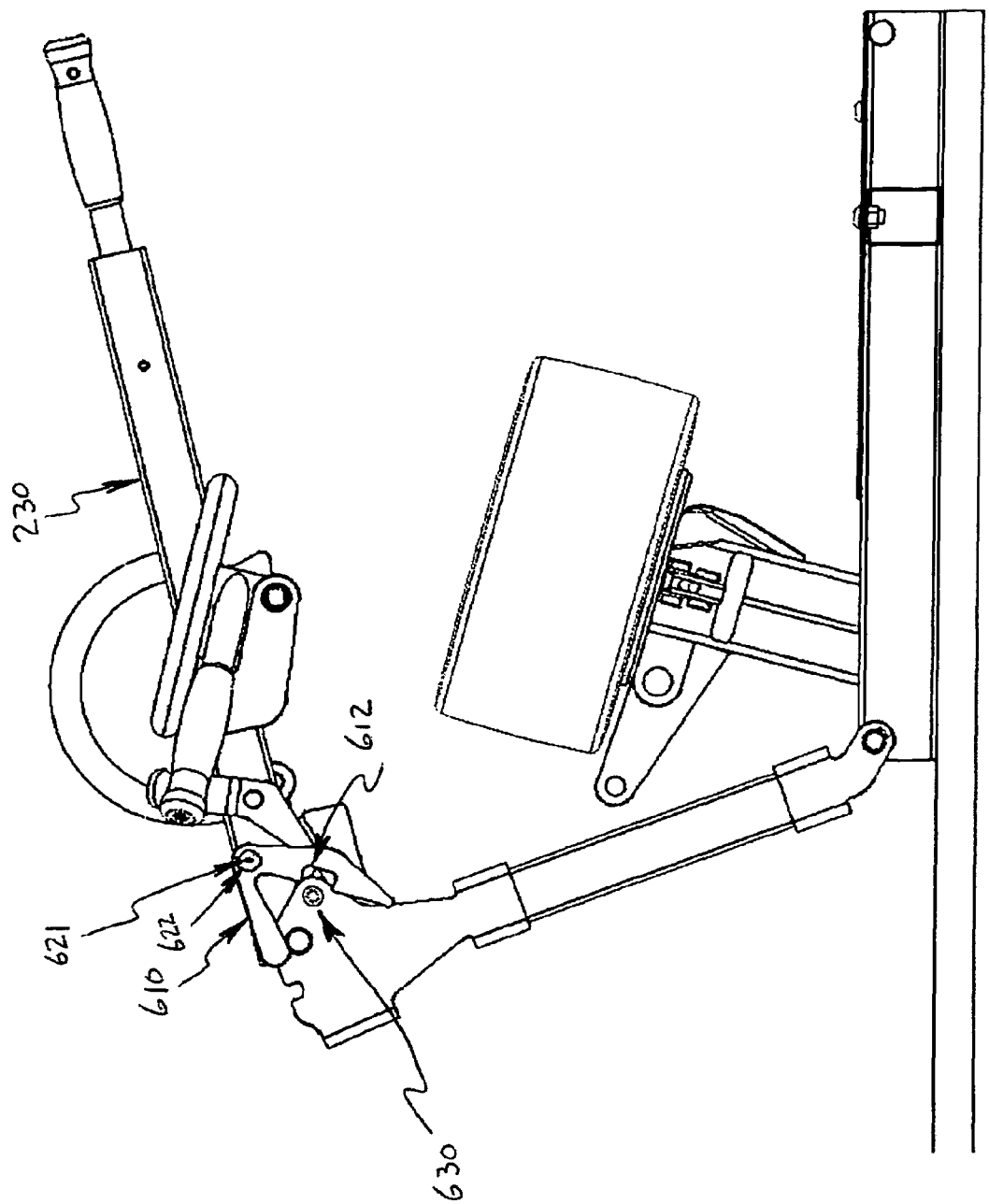
FIG. 12 is a side view illustration of certain aspects of a system for mounting and dismounting tires according to the present invention.
Figure 13:
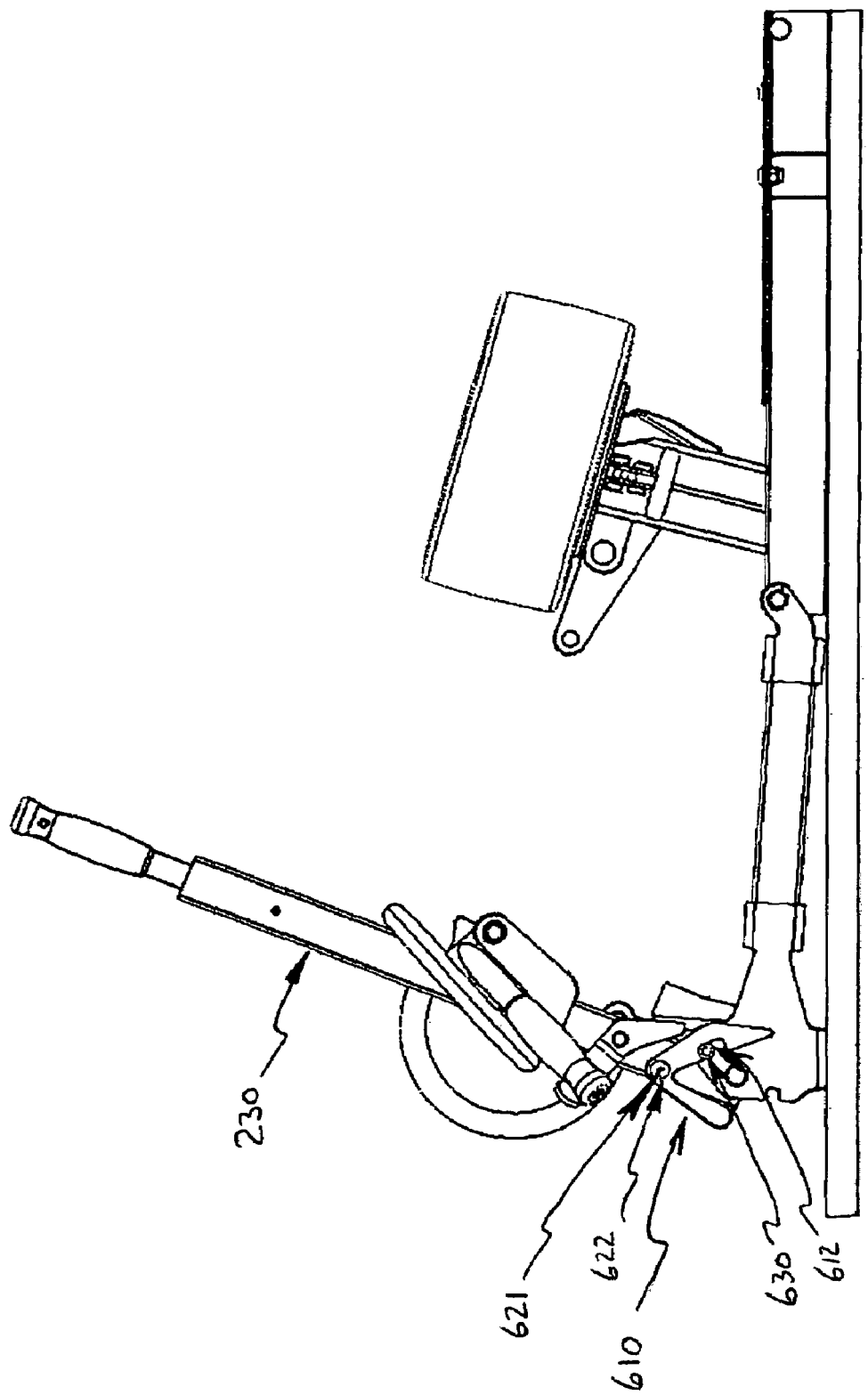
FIG. 13 is a side view illustration of certain aspects of a system for mounting and dismounting tires according to the present invention.

As illustrated in FIGS. 12 and 13, certain embodiments of the present invention may comprise a hold latch 610 operative to hold a backbone bar 230 in a fixed position. In one exemplary embodiment, hold latch 610 may be configured to rotate about a pivot axis 621 by means of a pivot mechanism 622, wherein pivot mechanism 622 may comprise of pins, axles, bearings, or other mechanisms for effecting rotation of hold latch 610 about pivot axis 621. Hold latch 610 may comprise a catch mechanism 612, such as, for example, a hole or slot as shown in FIGS. 12 and 13, wherein catch mechanism 612 is operative to engage and disengage a stop mechanism 630 to hold or release hold latch 610. As shown in FIG. 12, hold latch 610 may be configured to allow gravity or applied force or pressure to disengage any connection between catch mechanism 612 and stop mechanism 630 during certain operations, such as bead breaking or pressing a tire onto a rim. Hold latch 610 may be configured to disengage a connection between catch mechanism 612 and stop mechanism 630 when backbone bar 230 is moved to an upright position as shown with reference to FIG. 12. As shown in FIG. 13, hold latch 610 may be configured to swing into a position by gravity or applied force or pressure to engage a connection between catch mechanism 612 and stop mechanism 630 to restrain movement of hold latch 610, backbone bar 230, or both hold latch 610 and backbone bar 230. Hold latch 610 may be configured to engage catch mechanism 612 and stop mechanism 630 to restrain movement of hold latch 610, backbone bar 230, or both hold latch 610 and backbone bar 230 in certain operations, such as, for example, when placing or removing a tire from a rim.

An example of a tire mounting method according to certain aspects of the present invention is illustrated with reference to FIGS. 7 through 9. It should be noted that the invention is not limited to this exemplary implementation but that other implementations are possible.

In one exemplary embodiment of a method for mounting tires to rims according to the present invention, a rim 100 is temporarily affixed to a restraining base 210, where the restraining base presents the rim such that the axis of the rim 218 is offset from a reference plane 212 shown in FIG. 4 by an angle 214 between approximately 45 degrees and 90 degrees. As shown in FIG. 7, when certain embodiments of the present invention are positioned on a flat surface such as the ground, a paved surface, floor, or similar surface, this offset presents the rim axis offset from the vertical by an angle 216 between approximately 0 and 45 degrees.

The lower bead 310 of a tire as illustrated in FIG. 7 is typically a continuous bead surface around the inner perimeter of a tire. Lower bead 310 of tire 300 may be slipped onto the rim using hand manipulation of the tire alone or in conjunction with application of a suitable lubricant to the tire bead. Manipulation of the tire may include positioning tire 300 on top of rim 100 and tilting the tire in a counter-clockwise direction and pressing downward and to the right. Lower bead 310 may then be stretched into a non-circular shape by the upper rim edge 120 so that the lower bead 310 slips completely over upper rim edge 120 resulting in the tire being positioned as is shown in FIG. 7 with the lower bead 310 of the tire mounted on the rim 100.

A pressing element 248 may then be positioned against the upper tire sidewall 320. The pressing element 248 may be operatively manipulated to apply a progressive force profile to a selective area of tire 300 to press tire 300 onto the rim 100. A progressive force profile may be selected to minimize stress on areas of the tire 300, such as on the tire bead. Force profile includes level of force and area and location of force application. To further illustrate this exemplary embodiment of the present invention, tire 300 may first be manipulated to such a position that its upper bead left edge 332 forms a small gap 340 with respect to rim upper left edge 122. Pressing element 248 may then be rotated in a counter clockwise direction as shown in FIG. 8 and may simultaneously be pressed downward so that the tire upper bead left edge 332 is forced below the rim left upper edge 122. Pressing element 248 may then be further pressed downward so that tire upper bead left edge 332 is positioned approximately adjacent to a smaller diameter section 130 of rim 100 as shown in FIG. 8. This tire manipulation may result in distortion of the entire tire upper bead further facilitating tire mounting. In certain embodiments of the present invention, if the tire upper bead left edge 332 is not pressed down such that it is approximately adjacent to a smaller diameter section 130 of rim 100 the tire upper bead might not be sufficiently distorted to slip onto the rim without damaging the tire.

As shown in FIGS. 8 and 9, force may be applied to tire pressing element 248 in contact with selected areas of tire 300 so that tire pressing element 248 may be further pressed downward and may be rotated clockwise and may be shifted to the right or left operatively to slip tire upper bead 330 over upper rim edge 120. The example in FIG. 8 shows one upper bead edge 336 of tire 300 slipping over rim upper edge 120 as pressing element 248 is manipulated as described. Manipulation of pressing element 248 by clockwise rotation may be continued and may be combined with either right or left shifting or both right and left shifting until tire upper bead right edge 334 slips below rim upper edge 124 and the tire is fully positioned on the rim. This method has the advantage of pushing the tire onto a rim in a sideways motion, thereby providing advantages over conventional methods of installation, including methods using rotational devices to mount the tire on the rim. It will be obvious to one of skill in the art that application of other force profiles applied to other areas of tire 300 will be within the spirit and scope of the present invention.

With reference to FIGS. 4 and 7, in certain embodiments of the invention, a tire may be dismounted from a rim by dislodging the tire bead from a rim and then using simple dismounting tools and hand manipulation to dismount the tire. To further illustrate one embodiment of the present dismounting method, a conventional bead breaking tool may first be used to dislodge the tire beads from a mounted tire and rim using any method known in the art. Alternately, the mounted tire and rim may be affixed to a restraining base 210 wherein the restraining base is attached to a base assembly 200 as shown in FIGS. 4 and 7. The tire dismounting operator may then bear weight on a friction enhancing surface 202 as shown in FIGS. 3 and 4 so as to restrain the tire and rim relative to the operator, further aiding the tire removal operations. An operator may position a pressing element, such as pressing element 248 as shown in FIG. 9, against the sidewall of the tire. By a combination of downward or downward and lateral pressure to the tire sidewall through pressing element 248 the operator may then break the bead of the tire. In certain other embodiments bead breaking assemblies 520, 530 or a combination of 520 and 530 as illustrated in FIGS. 5, 6, 10, and 11 may be used to apply a force profile to selected areas of a tire to break one or both beads of the tire from the rim.

An operator may then apply a suitable lubricant to the tire beads. A tire lever may then be used to force a portion of the tire upper bead off of the rim. If the restraining base presents the rim with its axis offset from vertical by a non-zero angle then it may be advantageous to use the tire lever to first remove from the rim upper edge 124 the lower portion of the tire upper bead 334 as shown in FIG. 9. The tire may then be grasped by the downward facing sidewall 336 as shown on the right side in FIG. 9 and pulled upward and to the left to slip the tire bead completely from the rim. After the tire upper bead is removed from the rim, the lower tire bead may be readily removed from the rim by grasping the tire and pulling upward and to the left and rotating the tire counterclockwise as oriented in FIG. 8. A suitable tire lubricant may be used to facilitate this removal process.

Additional Description

Apparatus and methods are described for mounting and dismounting tires. In certain embodiments, an apparatus comprises a pressing assembly positionable relative to a fixed wheel rim wherein the pressing assembly controls force distribution across selected portions of a tire causing a tire bead to be eased onto the wheel rim. In certain of these embodiments, the pressing assembly is rotatable about an axis of rotation perpendicular to the wheel rim axis and wherein the axis of rotation is positionable in a plane that includes the wheel rim axis. In certain of these embodiments, the wheel rim is fixed to a base assembly. In certain of these embodiments, the apparatus further comprises a coupling that includes a first attachment point hingedly attached to the base assembly and a second attachment point defining an axis of rotation perpendicular to the wheel rim axis, wherein the pressing assembly is rotatably attached at the second attachment point. In certain of these embodiments, the coupling includes first and second bars rotatably attached at a third attachment point. In certain of these embodiments, the pressing assembly includes a first handle for rotating the pressing assembly about the axis of rotation and a second handle for positioning the axis of rotation in a plane that includes the wheel rim axis. In certain of these embodiments, the first and second handles are configured to transmit forces to the pressing assembly. In certain of these embodiments, the pressing assembly includes a pressing element shaped to control the force distribution. In certain of these embodiments, portions of the pressing element are curved. In certain of these embodiments, the form of the pressing element is generally circular or oval and may comprise one or more gaps and plural segments. In certain of these embodiments, the apparatus further comprising a bead breaking assembly for deflating an inflated tire. In certain of these embodiments, the bead breaking element engages the inflated tire responsive to operation of one or more handles.

In certain embodiments, a method for mounting a tire on a wheel rim is employed wherein the comprises fixing the wheel rim, applying force to one or more portions of the tire, and progressively and selectively adjusting the level of force applied to selected ones of the portions, changing location of selected ones of the portions, changing area of selected ones of the portions until a bead of the tire is eased onto the wheel rim. In certain of these embodiments, the force is applied to portions of the sidewall and tread of the tire, individually or in combination. In certain of these embodiments, the bead of the tire is deformed by indirect force applied through the portions of the sidewall and tread of the tire. In certain of these embodiments, the bead of the tire receives the force directly. In certain of these embodiments, the step of applying force includes locating an axis of rotation in a plane perpendicular to the axis of the wheel rim, rotating a pressing assembly about the angle of axis, and applying a desired level of force to the pressing assembly, wherein the pressing assembly includes a shaped member and the steps of locating and rotating operate to bring the shaped member into contact with the one or more portions of the tire.

In certain embodiments, a tire mounting apparatus comprises a base assembly including a mount for fixing a wheel rim, a pressing assembly, and a coupling having a first attachment point hingedly attached to the base assembly and a second attachment point defining an axis of rotation perpendicular to the wheel rim axis, the pressing assembly being rotatably attached at the second attachment point, wherein the coupling is operable to bring the pressing assembly into contact with selected portions of a tire, and wherein the pressing assembly distributes a force to the selected portions and indirectly causes deformation of a bead of the tire.

In certain of the above listed embodiments, tire mounting apparatus is compact and portable. In certain of these embodiments, apparatus is adapted to be operated manually by a user. In certain of these embodiments, user anchors the apparatus by standing or applying a force to the base. In certain of these embodiments, apparatus is anchored using combinations of fasteners including screws, bolts and rivets.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A tire mounting apparatus comprising:
    a base configured to fix a wheel rim;
    a pressing assembly rotatably coupled to the base and positionable relative to the wheel rim wherein the pressing assembly includes a substantially annular element configured to control force distribution across selected portions of a tire, thereby causing a tire bead to be eased onto the wheel rim;

a first handle attached to the pressing assembly through a pivot and configured to translate the pressing assembly relative to the wheel rim; and a second handle fixedly attached to the pressing assembly and configured to rotate the pressing assembly about a pivot axis of the pivot, wherein the pivot axis of the pivot is perpendicular to the axis of the wheel rim, wherein the first handle translates the pivot axis in a plane that includes the wheel rim axis.

2. The apparatus of claim 1, further comprising a connecting bar rotatably coupled to the base to which the wheel rim is fixed.

3. The apparatus of claim 1, and further comprising a coupling that includes a first attachment point hingedly attached to the base assembly and a second attachment point defining an axis of rotation perpendicular to the rim axis, wherein the first handle is rotatably attached at the second attachment point.

4. The apparatus of claim 3, wherein the coupling includes first and second bars rotatably attached at a third attachment point.

5. The apparatus of claim 1, wherein the pressing assembly includes a pressing element shaped to control the force distribution and wherein rotations of the rim and the pressing element are prevented with respect to the axis of the rim.

6. The apparatus of claim 5 wherein portions of the pressing element are curved.

7. The apparatus of claim 6 wherein the pressing element comprises a substantially circular hoop.

8. The apparatus of claim 7 wherein a central axis of the pressing element is offset from the axis of rotation.

9. A tire mounting apparatus comprising
a pressing assembly positionable relative to a rim fixed to a base assembly, wherein the pressing assembly is configured to control force distribution across selected portions of a tire causing a tire bead to be eased onto the rim; and a coupling that includes a first attachment point hingedly attached to the base assembly and a second attachment point defining an axis of rotation perpendicular to the rim axis, wherein the pressing assembly is rotatably attached at the second attachment point, wherein the coupling includes first and second bars rotatably attached at a third attachment point, and wherein the pressing assembly includes a first handle for rotating the pressing assembly about the axis of rotation and a second handle for positioning the axis of rotation in a plane that includes the wheel rim axis.

10. The apparatus of claim 9, wherein the first and second handles are configured to transmit forces to the pressing assembly.

11. The apparatus of claim 10, and further comprising a restraining base configured to mount the rim in a position offset from a reference plane, wherein the rim is positioned to optimize presentation of the tire for mounting and dismounting.

12. The apparatus of claim 11, and further comprising a bead breaking assembly for deflating an inflated tire.

13. A tire mounting apparatus comprising:
a base assembly including a restraining base for fixing a rim,
a pressing assembly, and
a coupling having a first attachment point hingedly attached to the base assembly and a second attachment point defining an axis of rotation perpendicular to the rim axis, the pressing assembly being rotatably attached at the second attachment point, wherein the coupling is configured such that the position of the axis of rotation is selectable with two degrees of freedom in a plane proximate to the rim, one dimension of the plane being aligned with the rim axis, wherein the coupling is operable to bring a substantially annular element of the pressing assembly into contact with selected portions of a tire, wherein the substantially annular element is configured to pivot from a first planar orientation parallel to a plane of the rim to a second planar orientation, thereby changing force distribution applied to the selected portions of the tire, and wherein the pressing assembly is operable to indirectly deform a bead of the tire.

14. The apparatus of claim 13 wherein the coupling includes first and second bars rotatably attached at a third attachment point.

15. The apparatus of claim 13 wherein the pressing assembly is manipulable such that the force distributed to the selected portions is progressively adjusted until the tire bead is eased onto the rim.

16. A tire mounting apparatus comprising
a base comprising a bolt assembly configured to fix a wheel rim to the base;

a pressing assembly rotatably coupled to the base and positionable relative to the wheel rim wherein the pressing assembly includes a substantially annular element configured to apply a force to one or more portions of a tire, the force having a variable level, wherein application of the force operates to ease a bead of the tire onto the fixed wheel rim; and a first handle attached to the pressing assembly through a pivot and a second handle fixedly attached to the annular element, the first and second handles being manipulable to progressively and selectively adjust the level of the force applied to selected ones of the portions, wherein the first and second handles are further operable to progressively and selectively change location of selected ones of the portions, wherein the force is applied about an axis of rotation and wherein the means for changing location includes means for manually repositioning the axis of rotation, wherein the first and second handles are further operable to progressively and selectively change the size of the selected portions, and wherein the bead of the tire is eased onto the wheel rim in response to application of the progressively and selectively adjusted force.

17. The tire mounting apparatus of claim 16, wherein the force is applied to at least one of a sidewall of the tire and a tread of the tire.

18. The tire mounting apparatus of claim 16, and further comprising an axis of rotation located in a plane perpendicular to the axis of the wheel rim, wherein the means for applying force includes a pressing assembly rotatable about the axis of rotation.

19. The tire mounting apparatus of claim 18, wherein the pressing assembly includes a shaped member configured to transmit the force to the one or more portions of the tire.

* * * * *